United States Patent
Ramoju

(10) Patent No.: US 12,405,942 B1
(45) Date of Patent: Sep. 2, 2025

(54) METHODS AND SYSTEMS FOR IDENTIFYING FLEET ERRORS

(71) Applicant: Caterpillar Inc., Peoria, IL (US)

(72) Inventor: Maheshwar Ramoju, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/633,506

(22) Filed: Apr. 11, 2024

(51) Int. Cl.
G06F 7/00 (2006.01)
G06F 16/23 (2019.01)
G06F 16/28 (2019.01)

(52) U.S. Cl.
CPC ........ G06F 16/2365 (2019.01); G06F 16/285 (2019.01)

(58) Field of Classification Search
CPC ........................... G06F 16/2365; G06F 16/285
USPC ......................................... 707/600–899, 691
See application file for complete search history.

(56) References Cited

U.S. PATENT DOCUMENTS

| | | | |
|---|---|---|---|
| 6,571,191 B1 | 5/2003 | York et al. | |
| 10,719,800 B2 | 7/2020 | Kwak | |
| 11,341,785 B2 | 5/2022 | Lowenthal et al. | |
| 11,587,224 B2 | 2/2023 | Tang et al. | |
| 11,595,779 B2 | 2/2023 | Brady | |
| 2004/0249720 A1* | 12/2004 | Wookey | G06Q 30/0601 705/26.1 |
| 2006/0074707 A1 | 4/2006 | Schuette et al. | |
| 2012/0123951 A1 | 5/2012 | Hyatt et al. | |
| 2020/0410163 A1 | 12/2020 | Shah et al. | |
| 2023/0054982 A1 | 2/2023 | Corda et al. | |

OTHER PUBLICATIONS

Written Opinion and International Search Report for Int'l. Patent Appln. No. PCT/US2025/019472, mailed Jun. 16, 2025 (12 pgs).

* cited by examiner

Primary Examiner — Isaac M Woo

(57) ABSTRACT

A technique is directed to methods and systems for detecting and correcting errors and abnormalities in assembling fleet lists within one or more platforms. A fleet management system can analyze asset information, such as last known position, history of device attachments, or joins between devices/datasets, to detect and correct errors and abnormalities in the assembling fleet lists. The fleet management system can use rules as filter types for recursive evaluation of telemetry errors and abnormalities arising from a source or a sensor. The errors or abnormalities are identified in the asset information when the asset information exceeds a rule.

20 Claims, 15 Drawing Sheets

Home / Fleet Lists / New Fleet List

CRITERIA ( Step 2 of 3 )          Traditional | Advanced                                    Add Criteria Criteria 1

| Attributes | Subscription & Device | Health & Location | ECM | DTC | Measures | Rules | Telemetry |
                                       ⌇334                                              ⌇332

Date Option   Reset
● Last Known  ○ Absolute  ○ Relative
☐ Exclude CAT Mode

Subscription ☐ Exclusion List                                ☐ Exclude Self Registered Devices     ☐ Exclude Suspended Subscription Subscription App                    ⌄ Subscription Name Criteria        Subscription Name              +

Dealer/Customer ☐ Exclusion List

Dealer                              ⌄ Customer ID Criteria              Customer ID                    +

Main Device Config ☐ Exclusion List

Config Part Number Criteria         ⌄ Config Part Number                Combination Field   ⌄ Combination Field Value   +

Main Device Firmware ☐ Exclusion List

Firmware At-least   Firmware At-most   Type                   ⌄ Combination Field   ⌄ Combination Field Value   +

Radio Device Firmware ☐ Exclusion List

Firmware At-least   Firmware At-most   Type                   ⌄ Combination Field   ⌄ Combination Field Value   +

Back        Cancel        Save        Next

Home / Fleet Lists / New Fleet List

LOGICAL CRITERIA ( Step 3 of 3 )

Fleet List Criteria

Logical Criteria
Criteria 1

Criteria 1
Attributes
Commercial Device Type IN (PL641)

AND Subscription & Device
Last Known
AND Subscription IN
( ANY:ANY )

*FIG. 3D*

Home / Fleet Lists / Created

Short Name

Created                                7 / 40

Description

Publishing process allows sharing, setting a refresh plan, and customizing additional options    93 / 200

○ Do Not Share
● Share with Selected Users  — 358
○ Share Globally

Refresh Plan 360

Daily ∨

☐ Compute Quality Metrics   ☐ Applies for BI Reports   ☐ Applies for Data Reports   ☐ Used by external Apps Cancel    Submit

*FIG. 3E*

Flagged Telemetry Data Dashboard (Helios) 391

*Fleet list : Elite Asset Fleet List : Elite Assets Download by Partnumber and Commercial device type (Last Refreshed: 9/27/2023 6:36:46 PM UTC)* 393

| Fleet List Total 392a | Total Flagged Assets Count: 212,908 | | | | | | | | Reported Assets 392k |
|---|---|---|---|---|---|---|---|---|---|
| | Hours 392b | Location 392c | Fuel 392d | Utilization 392e | Diagnostics 392f | Subscription 392g | Reporting 392h | General 392i | |
| 464,498 | 80,945 | 105,875 | 116,272 | 72,089 | 2,204 | 28,737 | 13,529 | | 282,455 |

Commercial Device Type 396a
- PLE641: 72,955
- PLE643: 59,195
- PLE742: 18,341
- PLE602: 12,555
- PLE631: 12,434
- PLE683: 10,156
- PLE743: 9,041

PL Firmware 396b
- 6254543-00: 25,557
- 6306318-00: 14,362
- 6338059-00: 12,633
- 6254540-00: 11,868
- 6467498-00: 11,121
- 6254518-00: 10,917
- 6158811-00: 6,345

Radio Firmware 396c
- 6370644-00: 54,005
- 6279042-00: 49,975
- 6295746-00: 12,008
- 9412745-00: 11,968
- 6279041-00: 11,206
- 6365230-00: 8,389
- 6279505-00: 8,140

Sales Model 396d
- 320: 19,971
- 308: 14,283
- 336: 9,606
- 323: 8,231
- 330: 6,882
- 950M: 5,759
- 966M: 4,530

Rules 396e
- ARD Fuel is NULL: 92,546
- Location Invalid: 78,161
- SMH decrease: 56,880
- Heading Invalid: 49,857
- Invalid Subscription change: 28,709
- Idle Fuel is NULL: 26,287
- Ground Speed Invalid: 21,721

Configuration File 396f
- Null: 209,023
- 5812154-00: 5,537
- 6472211-00.cfg: 439
- 6435034-00: 370
- 6248861-00: 153
- 5783260-00: 147
- 6472211-00: 140

Dealer 396g
- XXXX-UNKNOWN: 12,938
- J440-LSH/EAST CHINA: 8,212
- W611-NCD: 7,006
- N020-TOROMONT: 5,962
- E140-HOLT TEXAS: 5,848
- U060-SOTREQ: 5,534
- M610-FINNING UK: 4,735

Subscription Name 396h
- CONNECT: 82,170
- PERFORMANCE-10 MI...: 37,830
- CONNECTPRO: 30,919
- CAT DAILY: 17,903
- XXXX-UNKNOWN: 12,643
- CAT ESSENTIALS-HOU...: 11,238
- VISIONLINK DAILY: 7,462

File Type 396i
- 10209: 175,117
- 10138: 111,396
- 10039: 100,175
- 10184: 34,720
- Null: 28,737
- 10215: 28,290
- 10065: 5,451

METHODS AND SYSTEMS FOR IDENTIFYING FLEET ERRORS

BACKGROUND

Generally, companies that manage thousands or millions of construction machines, such as loader or hauler machines, frequently are unable to accurately track the status of the machines. Data associated with the machines is often incorrect, and companies are searching for a solution to detect errors and abnormalities with the machine data associated with tracking the machines. Currently, to detect errors and abnormalities with the machine data a user must manually verify at a worksite if the machine data is correctly associated with the proper machine. Companies have implemented various techniques to solve this problem. For example, U.S. Pat. No. 11,587,224B2 describes a method for detecting a mismatch between image data of a vehicle and vehicle listing data. However, this method is only directed to identifying and correcting image errors. Additionally, U.S. Pat. No. 6,571,191B1 describes a method for maintaining a database of calibration upgrades. However, this method is only directed to determining whether the recalibration history includes the latest calibration upgrades.

BRIEF DESCRIPTION OF THE DRAWINGS

FIGS. 3B, 3C, and 3D illustrate a user interface for inputting fleet list details into a fleet management application, in accordance with one or more embodiments of the present technology.

FIG. 3E illustrates a user interface for publishing details of a fleet list in a fleet management application, in accordance with one or more embodiments of the present technology.

FIG. 3H illustrates a user interface displaying a dashboard example of flagged telemetry data in a fleet management application, in accordance with one or more embodiments of the present technology.

FIG. 3I illustrates a user interface displaying derived objects being updated with machine information, in accordance with one or more embodiments of the present technology.

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for detecting and correcting errors and abnormalities in assembling fleet lists within one or more platforms. A fleet management system can analyze asset information, such as last known position, history of device attachments, or joins between devices/datasets, to detect and correct errors and abnormalities in the assembling fleet lists (i.e., machine identifier information). The fleet management system can use rules as filter types for recursive evaluation of telemetry errors and abnormalities arising from a source or a sensor. The errors or abnormalities are identified in the asset information when the asset information exceeds a rule. In a first example, the fleet management system identifies an error or abnormality if the location of a machine changes a threshold distance within a time threshold, such as the location of a machine changed from Canada to Africa in under five hours. The fleet management system identifies the error due to the machine requiring a threshold of 60 hours to ship from Canada to Africa. In a second example, the fleet management system identifies an error or abnormality if the hours of operation of a machine exceed a time threshold, such as the hours of operation exceeding 24 hours within a day.

As described in detail below, implementations of the present technology can provide technical advantages over conventional technology by: 1) eliminating the requirement to manually verify machine information; 2) allowing for various levels of complexities to be used when creating a fleet list; 3) creating a user interface to automate monitoring the status of millions of machines; 4) supporting effective and timely tracking of machine data; 5) increasing the accuracy of a fleet list generation; 6) identifying and correcting errors to reduce processing inaccurate data; 7) identifying broken sensors or device on the machines based on identified errors; and 8) identifying patterns of systemic machine issues.

Figure 1:
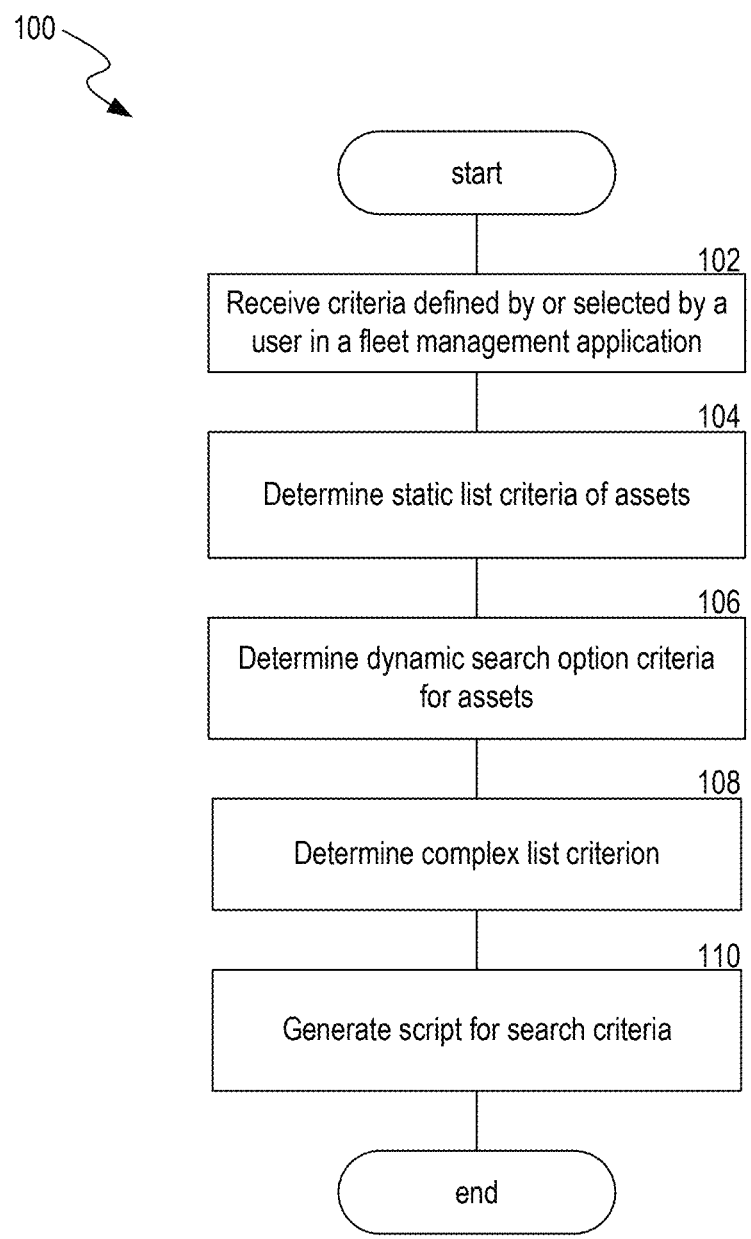
FIG. 1 is a flow diagram illustrating a process used in some implementations for determining criteria to search fleet asset data, in accordance with one or more embodiments of the present technology.

Several implementations are discussed below in more detail in reference to the figures. FIG. 1 is a flow diagram illustrating a process 100 used in some implementations for determining criteria to search fleet asset data, in accordance with one or more embodiments of the present technology. In some implementations, process 100 is triggered by a user activating a fleet management application, powering on a device, the user accessing a fleet asset database via a website portal, a machine or device sending data to the fleet management system, or the user downloading an application on a device to access the fleet management system. In various implementations, some or all of process 100 is performed locally on the user device or performed by cloud-based device(s) that can provide/support the fleet management system.

At step 102, the fleet management system receives criteria defined by or selected by a user in a fleet management application. The user can access the fleet management application on a user interface displayed on a device. Based on the criteria, the fleet management system can search a database(s) to find the assets (e.g., machines) associated with the criteria. Examples of machines are, but not limited to, bulldozers, excavators, trenchers, loaders, backhoes, compactors, graders, feller bunches, graders, wheel tractor scrapers, skid-steer loaders, dump trucks, cranes, telehandlers, pavers, pile-driving/boring machines, or any mining or construction machines.

At step 104, the fleet management system determines static list criteria. The static list criteria can include a static list of asset serial numbers. The fleet management system can validate the static list and return all valid asset serial numbers or make codes. In some implementations, the asset serial number includes an asset serial number prefix and a serial number range.

At step 106, the fleet management system determines dynamic search option criteria of assets. The dynamic search options can include categories, such as telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset.

The telematics device data can include a device serial number, a device identifier, a device hardware part number, a device serial number code, a configuration part number, or a device firmware part number. The radio device data can include a radio serial number, radio hardware part number, a radio serial number code, or a radio firmware part number associated with an asset. The SIM card data can include an ICCID, IMSI, MEID, IMEI, or any SIM card information. The telematics package can include a commercial device type. The product data can include the product family, product model, or build year. The subscription data can include a subscription application or subscription name. The dealer/customer data can include a dealer code, a dealer name, or a customer identifier. The location data can include a country/state/city/providence name, a latitude and longitude coordinates, GPS data, distance from a latitude and longitude coordinate, an address, or any location information.

The asset health data can include engine status (e.g., running, stopped, off, etc.), system voltage, device last reported, or radio last reported. The ECM data can include an ECM hardware part number, an ECM firmware part number, an ECM identifier, an ECM function (e.g., transmission), an industry group, a manufacturer code, or a vehicle system. The DTC data can include fault codes, such as proprietary fault codes (e.g., event code, FMI, severity level, machines with fault codes within the last 7 days, etc.), or Public J1939 fault codes (e.g., event code, FMI, severity level, etc.). The lifetime total measure data can include operating hours, idle hours, total fuel, aftertreatment regeneration (ARD) fuel, idle fuel, or engine fuel. The daily delta data can include operating hours, idle hours, total fuel, ARD fuel, idle fuel, or engine fuel. The quality rule data can include hours rules, location rules, fuel rules, diagnostics rules, utilization rules, timestamp rules, subscription rules, or reporting rules. Each individual rule can be searchable. The telemetry data can include continuous runtime, message type, or message trigger.

At step 108, the fleet management system determines complex list criterion. The fleet management system can generate a fleet list using a single criterion. The single criterion may have a combination of any of the dynamic search options (from step 106). An example can include:

Criteria 1
   Attributes
   Make Group IN (CAT)
   AND CAT Asset Build Year AT LEAST 2022
   AND Cat Product Family: Model IN
   (Backhoe Loader-Center Pivot: ANY,
   Backhoe Loader-Side Shift: ANY,
   Compact Wheel Loader: ANY,
   Mini Hydraulic Excavator: ANY,
   Skid Steer Loader: ANY,
   Multi Terrain & Compact Track Loader: ANY,
   Small Track Type Tractor: ANY,
   Small Wheel Loader: ANY,
   Telehandler: ANY)

A user can add any number of criteria for a complex search. Multiple criteria may be used in an AND-OR-NOT logical expression to form the overall criteria. An example is: [Criteria 1] AND ([Criteria 2] OR [Criteria 3]) AND (NOT [Criteria 4]). At step 110, the fleet management system generates a script (e.g., SQL script) for complex search criteria that involves other dimensions or measures or complex behavioral aspects of the assets. An example is:

SELECT
   CONCAT (ASSET_SERIAL_NUMBER,
   STANDARD_MANUFACTURER_CODE) AS REG_ID
FROM
   CDQ.ASSET_DEVICE_RELATIONSHIP_VW
WHERE
   (COMMERCIAL_DEVICE_TYPE= 'DEVICE1'
     AND NVL (SOFTWARE_PART_NUMBER, 'NULL')< > '1234567-00')
   OR (RADIO_DEVICE_TYPE= 'RADIO1'
     AND NVL (RADIO_SOFTWARE_PART_NUMBER,'NULL')< > '2345678-00')

The fleet management system can search a database(s) using criteria selected by a user to identify a list of all matching assets. The fleet management system searches can generate a fleet list with the matching assets that have the selected criteria. Multiple such fleet lists can be created by users for various business use cases with their own custom criteria for each fleet list.

Figure 2:
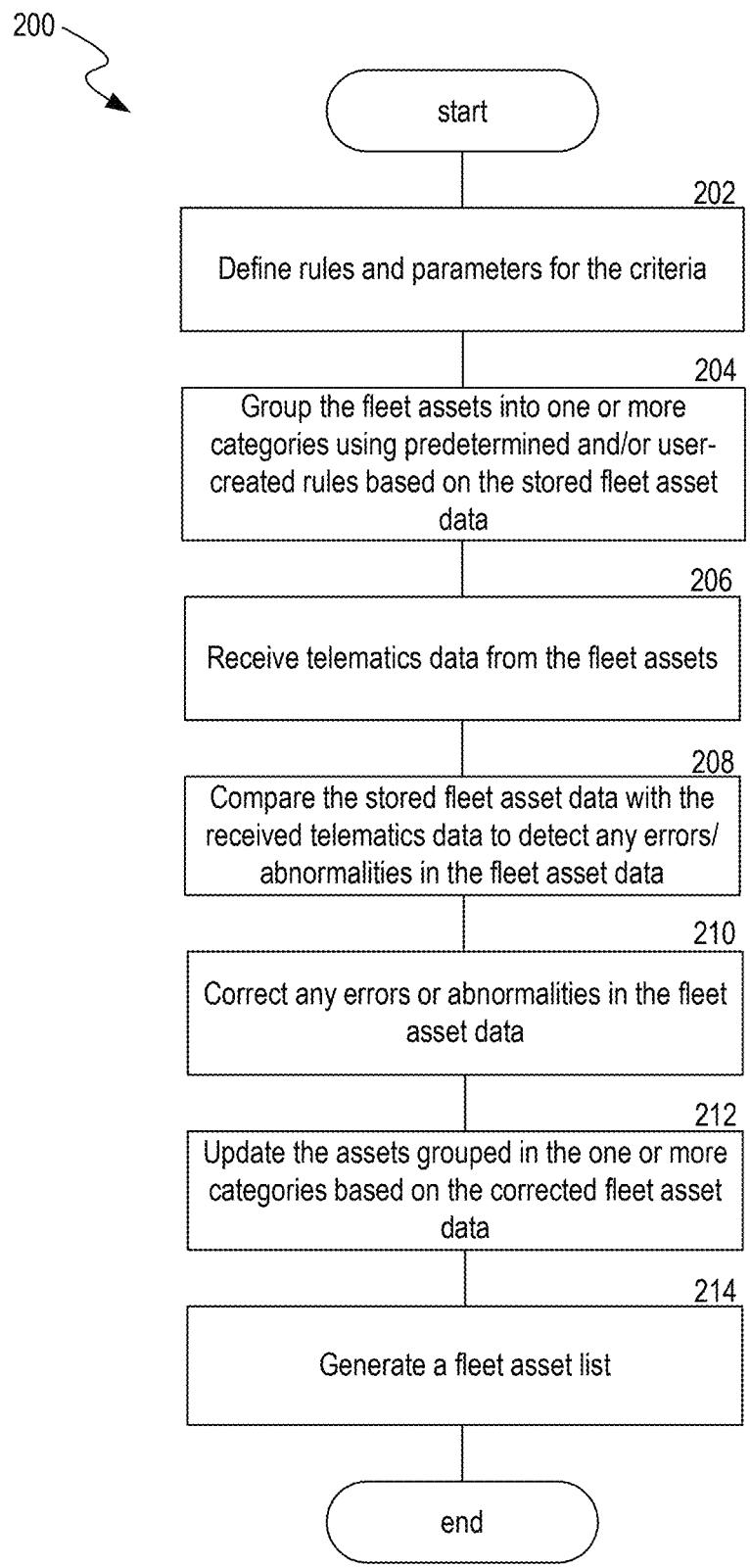
FIG. 2 is a flow diagram illustrating a process used in some implementations for detecting and correcting errors in fleet asset data, in accordance with one or more embodiments of the present technology.

FIG. 2 is a flow diagram illustrating a process 200 used in some implementations for detecting and correcting errors in fleet asset data, in accordance with one or more embodiments of the present technology. In some implementations, process 200 is triggered by a user activating a fleet management application, powering on a device, the user accessing a fleet asset database via a website portal, a machine or device sending data to the fleet management system, or the user downloading an application on a device to access the fleet management system. In various implementations, some or all of process 200 is performed locally on the user device or performed by cloud-based device(s) that can provide/support the fleet management system.

At step 202, the fleet management system defines rules and parameters for the criteria to identify errors and abnormalities in asset data. The parameters can include threshold values (e.g., hours of operation, location change in a day, etc.) that if exceeded indicate an error or abnormality of an asset. The rules can include hour rules, location rules, fuel rules, diagnostics rules, utilization rules, timestamp rules, subscription rules, or reporting rules. Each individual rule can be predefined, or user defined. In a first example, if a machine operates for more than a time threshold (e.g., 24 hours in a day), the fleet management system determines that there is an error or abnormality associated with the machine. In a second example, if a location of a machine changes more than a threshold distance (e.g., 3000 miles in a 24-hour period), the fleet management system determines that there is an error or abnormality associated with the machine. The parameters can include a machine type associated with the asset. For example, if a mining machine is identified at a road construction location, the fleet management system determines that there is an error or abnormality associated with the mining machine. In some implementations, a user defines some or all of the parameters for the criteria.

At step 204, the fleet management system groups the fleet assets into one or more categories using predetermined and/or user-created rules associated with the criteria. The categories can include application, machine type, telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset. The fleet management system can analyze fleet asset data according to a single category or multiple categories of a criteria.

At step 206, the fleet management system receives telematics data from the fleet assets. The telematics data can include, machine location, machine identifier number, speed of travel, machine type, machine function, machine owner, productivity information, utilization information, duration the machine has been within a proximity of a location, duration a machine has been operating, maintenance information, serial number, machine identifier, or subscription information. The fleet management system can collect the information via one or more devices (e.g., 3D cameras, sensors, radios, engine sensors, infrared cameras, range finders, geolocation monitors, motion sensors, laser scanners, accelerometers, temperature sensors, vibration sensors, or tilt sensors, etc.) attached to the asset.

At step 208, the fleet management system compares the stored fleet asset data with the received telematics data to detect any errors, abnormalities, or both, in the fleet asset data. Detecting an error/abnormality can include identifying any difference between the stored fleet asset data and the received telematics data. Once a difference is identified, the fleet management system can analyze the difference according to the rules and parameters of the selected criteria. In a first example, if a sensor of a machine indicates that a machine has been operating continuously for a time threshold (e.g., 12 hours), the fleet management system determines that the sensor has an error due to operators powering down the machine during breaks. In a second example, if a location of a machine changes between multiple countries a distance threshold apart, the fleet management system determines that a location device of the machine has malfunctioned. In a third example, if an asset device/part attachment does not match an asset device/part attachment history for the machine, the fleet management system determines the asset device/part attachment has been incorrectly assigned to the machine. The fleet management system can identify errors using a set of rules that are executed on incoming telematics data and the violations are stored in a database. The fleet list application queries the data and identifies which machines have violated what rules using the criteria defined in the fleet list.

At step 210, the fleet management system corrects any errors, abnormalities, or both in the fleet asset data. The fleet management can identify the type of data and/or sensor or device associated with the identified error/abnormality of the asset and correct the data in the database or ignore the received telematics data. In some implementation, the fleet management system can generate a notification to replace a device/sensor that is providing inaccurate data. The fleet management system can execute rules on incoming telematics data, to identify errors and take corrective action by removing inaccurate data elements. Examples of inaccurate data can include: 1) life time hours on a machine are more than 4.5 million hours, or 2) location coordinates of a machine are in the middle of an ocean (e.g., Latitude=0, Longitude=0) from telematics messages. The corrected messages are passed on for consumption by downstream applications.

At step 212, the fleet management system updates the assets grouped in the one or more categories based on the corrected fleet asset data. For example, the fleet management data can update the stored data with new locations, attachment data, sensor data, or any change data from the telematics data associated with an asset. For example, if a machine validly changes locations according to the rules and parameters, the fleet management system updates the location data for the machine. The fleet management system parses telematics data from the machines and stores the latest information in a set of derived objects, such as last known hours, last known location, last known fuel consumption, last known asset-device relationship, last known software on telematics and ECMs on the machine, etc. These derived objects are updated periodically (e.g., at the end of each day) for consumption by the fleet list application.

At step 214, the fleet management system generates a fleet asset list with the updated and verified information. The fleet list can be displayed on a user interface for a user to review. The fleet list can include verified data, such as machine type, telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset.

Figure 3A:
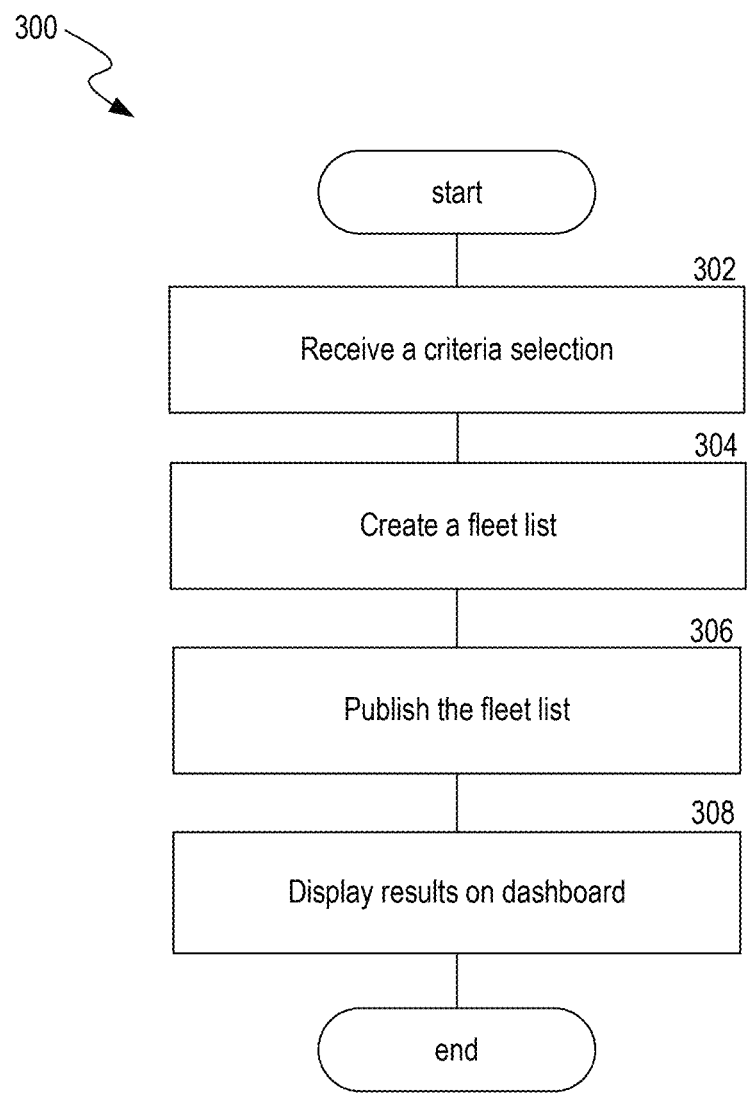
FIG. 3A is a flow diagram illustrating a process used in some implementations for creating a fleet list, in accordance with one or more embodiments of the present technology.

FIG. 3A is a flow diagram illustrating a process 300 used in some implementations for creating a fleet list, in accordance with one or more embodiments of the present technology. In some implementations, process 300 is triggered by a user activating a fleet management/list application, powering on a device, the user accessing a fleet asset database via a website portal, a machine or device sending data to the fleet management system, or the user downloading an application on a device to access the fleet management system. In various implementations, some or all of process 300 is performed locally on the user device or performed by cloud-based device(s) that can provide/support the fleet management system.

At step 302, the fleet management system can receive a selection by the user of criteria to search for errors in asset data. Based on the criteria selected by the user, the fleet management system searches the database to find the assets that match the selected criteria and retrieves telematics data from the assets. The user can select the criteria via a user interface of a fleet management application executing on a user device. The user can check boxes or input details in the fleet management application to create a fleet list.

Figure 3B:
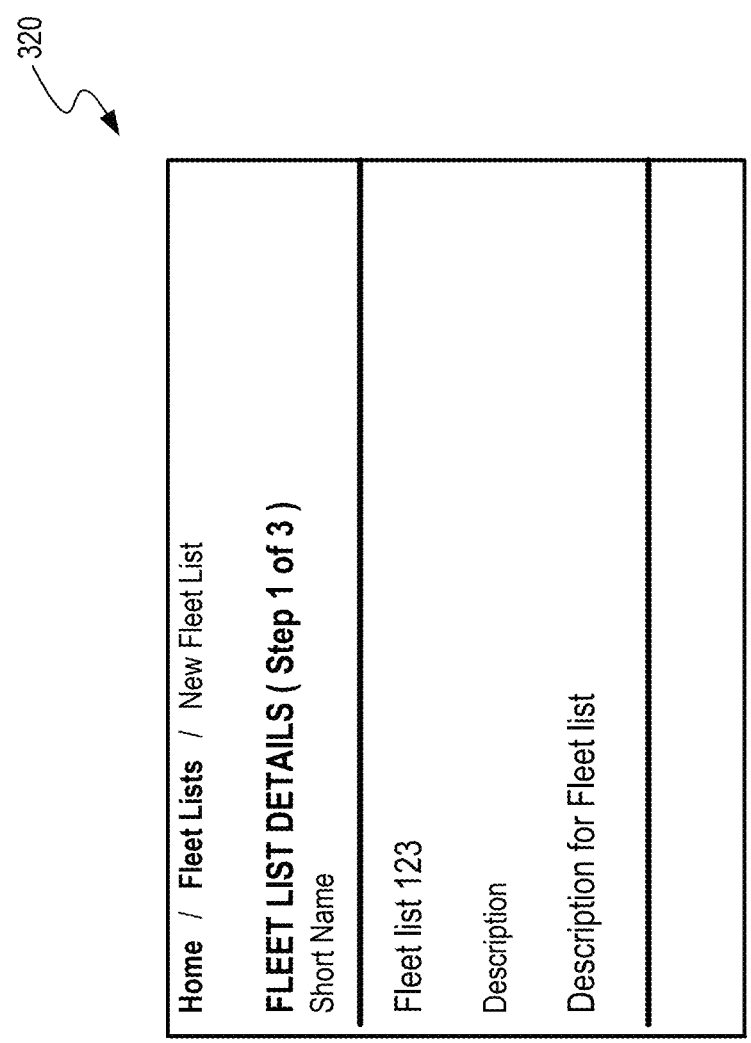

FIG. 3B illustrates a user interface 320 for inputting fleet list details into a fleet management application, in accordance with one or more embodiments of the present technology. A user can input a name and a detailed description for the user defined fleet list into the fleet management application. This can be used to identify fleet lists with the purpose for which they are defined.

FIG. 3C illustrates a user interface 330 for inputting fleet list details into a fleet management application, in accordance with one or more embodiments of the present technology. A user can select dynamic search options 332 that can include attributes, subscription and device, health and location, ECM, DTC, measures, rules, or telemetry. As an illustrative example, user interface 330 displays the user selected subscription and device 334. Upon selection of subscription and device 334, the user interface 330 displays criteria, such as subscription, dealer/customer, main device configuration, main device firmware, and/or radio device firmware. Each criteria can have drop down menus and input boxes for a user to select and/or input information. FIG. 3C illustrates how a user can define a complex criteria for the fleet list. The criteria can be in terms of business terminology. Example criteria can include: assets built in 2020 or later that are subscribed to a particular company being serviced by a particular dealer, having telematics main device firmware 1234567-00 or later and radio firmware 3456789-00 or later, and located within 100 miles from XX latitude, YY longitude, and that have DTC fault code D 123-4 that occurred in last 7 days.

FIG. 3D illustrates a user interface 350 for inputting fleet list details into a fleet management application, in accordance with one or more embodiments of the present technology. The user interface 350 displays logical criteria, attributes, subscription information, and device information for the fleet list criteria. FIG. 3D defines criteria for a user's review and can proceed to creation of fleet list or go back and adjust the criteria based on user selection.

At step 304, the fleet management system creates a fleet list of verified asset data based on a comparison of stored data to received telematics data (as described in FIG. 2). The fleet management system can create multiple fleet lists for various business use cases with customized criteria for each fleet list.

At step 306, the fleet management system publishes the created fleet list. The fleet list can be displayed on a user interface of the fleet management application.

FIG. 3E illustrates a user interface 356 for publishing details of a fleet list in a fleet management application, in accordance with one or more embodiments of the present technology. A user can select share options 358 that can include do not share, share with selected users, and/or share globally. User interface 356 can display a refresh plan 360 for a user to select the frequency that a fleet list is refreshed.

At step 308, the fleet management system displays the results of the fleet list on a dashboard of the fleet management application.

Figure 3F:
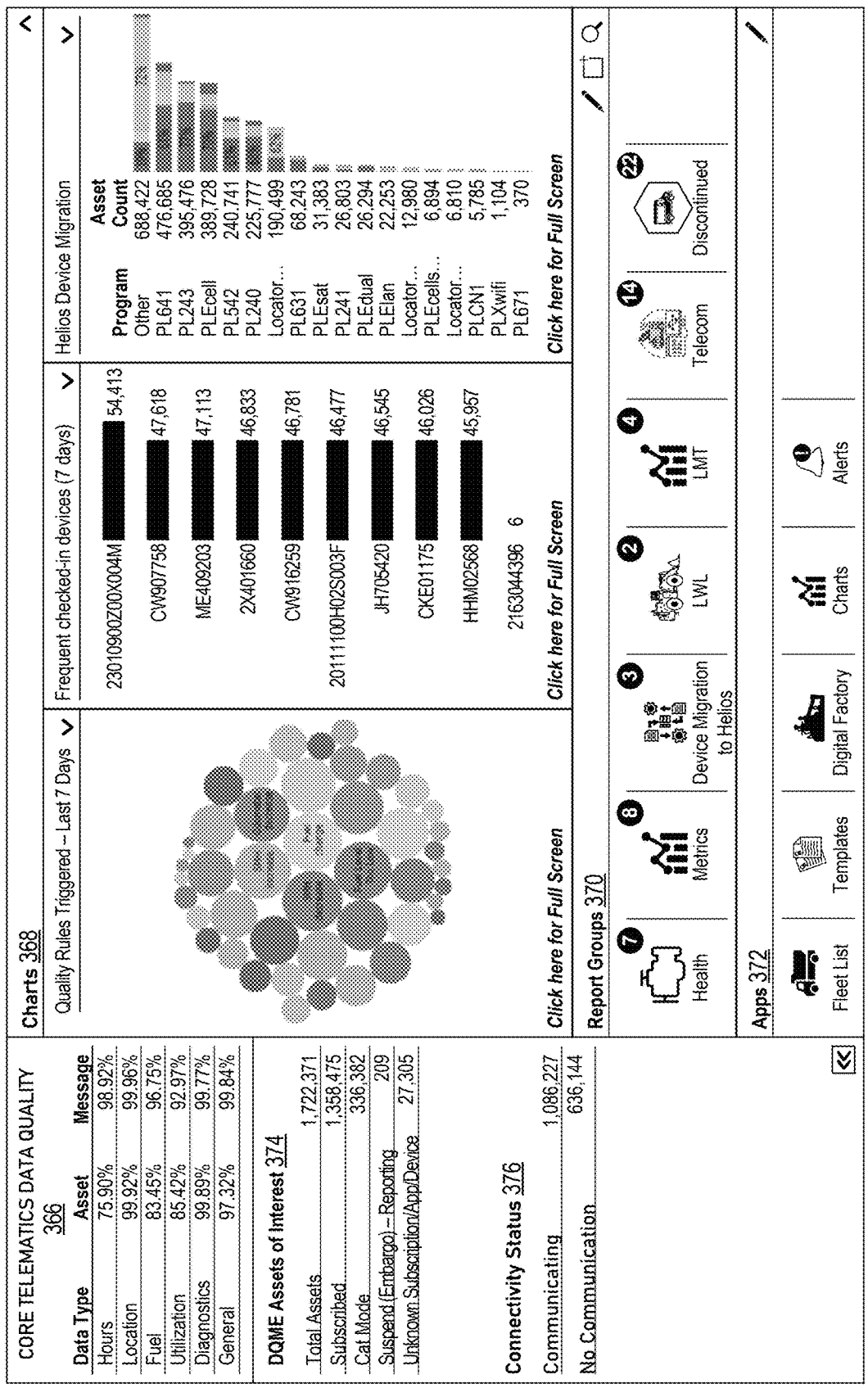
FIG. 3F illustrates a user interface displaying a dashboard example of results of a fleet list in a fleet management application, in accordance with one or more embodiments of the present technology.

FIG. 3F illustrates a user interface 365 displaying a dashboard example of results of a fleet list in a fleet management application, in accordance with one or more embodiments of the present technology. User interface 365 displays core telematics data quality 366, charts 368, report groups 370, apps 372, DQME assets of interest 374, and connectivity status 376. The core telematics data quality 366 can include data type, asset, and or message. The charts 368 can include quality rules triggered, frequent checked-in devices, and helios device migration. Users with creator access may create additional charts as needed. Business users may select the interested charts to display on their computer screen as by charts 368. Each user may have separate charts selected based on their interest. Report groups 370 can include health, metrics, device migration to helios, LWL, LMT, and telecom. The discontinued reports may be moved to a discontinued report group. Apps 372 can include fleet list, templates, digital factory, charts, and alerts. DQME assets of interest 374 can include total assets, subscribed, CAT mode, suspend (embargo) reporting, and unknown subscription/app/device. Connectivity status 376 can include communicating and no communication.

Figure 3G:
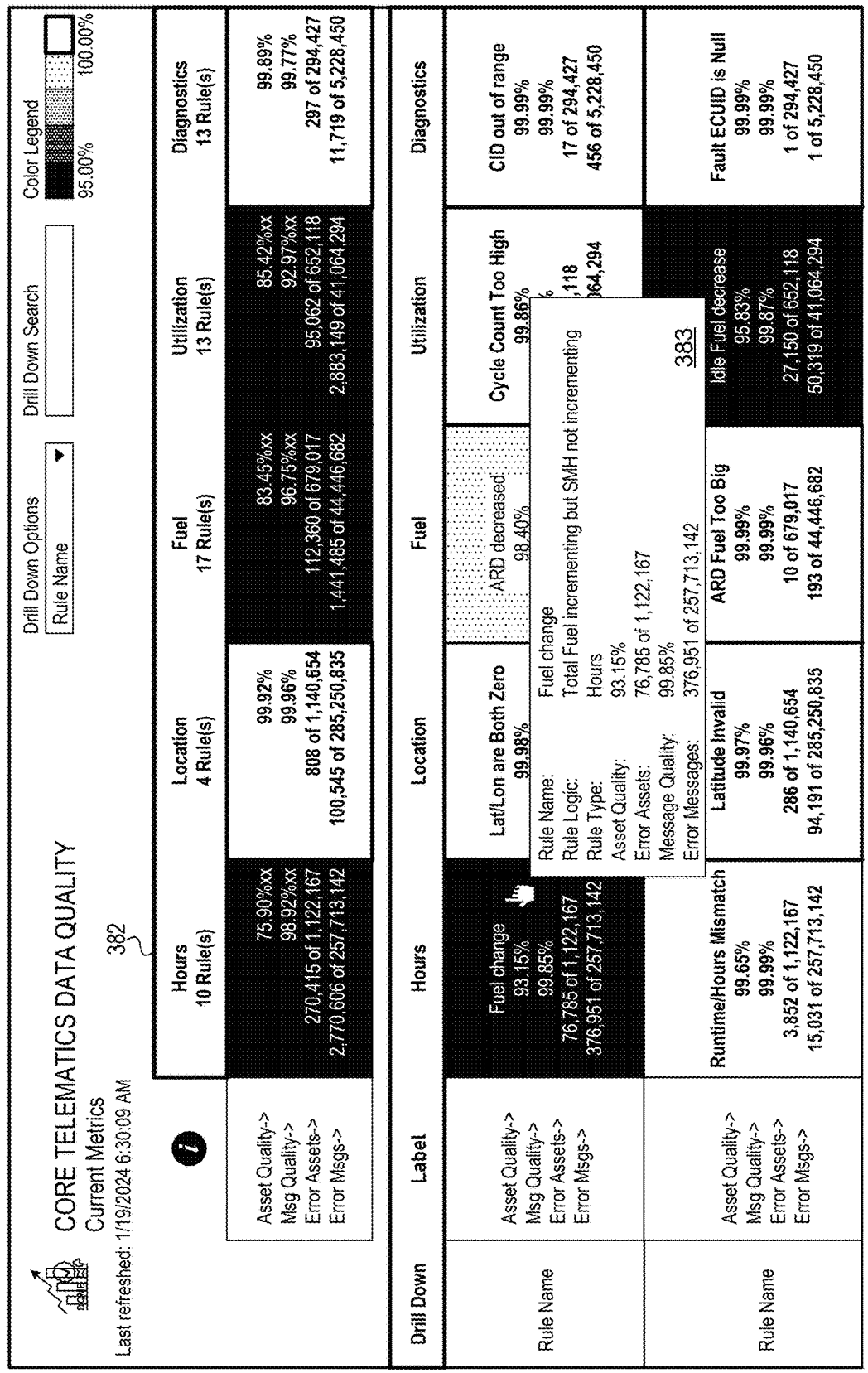
FIG. 3G illustrates a user interface displaying a dashboard example of core telematics data quality in a fleet management application, in accordance with one or more embodiments of the present technology.

FIG. 3G illustrates a user interface 380 displaying a dashboard example of core telematics data quality in a fleet management application, in accordance with one or more embodiments of the present technology. The dashboard can display categories 382 and the number of rules associated with each category. For example, hours (10 rules), location (4 rules), fuel (17 rules), utilization (13 rules), and diagnostics (13 rules). The user interface 380 can display a drill down for each category by rule name, rule logic, rule type, asst quality, error assets, message quality, and error messages, as illustrated in box 383.

FIG. 3H illustrates a user interface 390 displaying a dashboard example of flagged telemetry data in a fleet management application, in accordance with one or more embodiments of the present technology. User interface 390 displays a fleet list integration with a tableau dashboard. The flagged telemetry data dashboard 391 can display a fleet list total 392a, the total flagged asset count 393, the number of assets flagged per category (e.g., hours 392b, location 392c, fuel 392d, utilization 392e, diagnostics 392f, subscription 392g, reporting 392h, and general 392i), and the number of reported assets 392k. User interface 390 can display information for commercial device type 396a, PL firmware 396b, radio firmware 396c, sales model 396d, rules 396e, configuration file 396f, dealer 396g, subscription name 396h, and file type 396i. In this example, the flagged telemetry data dashboard 391 is customized for the selected fleet list. Each user may use the same dashboard with their own fleet lists to get a report on how their fleet is functioning and the rules being violated.

Figure 3I:
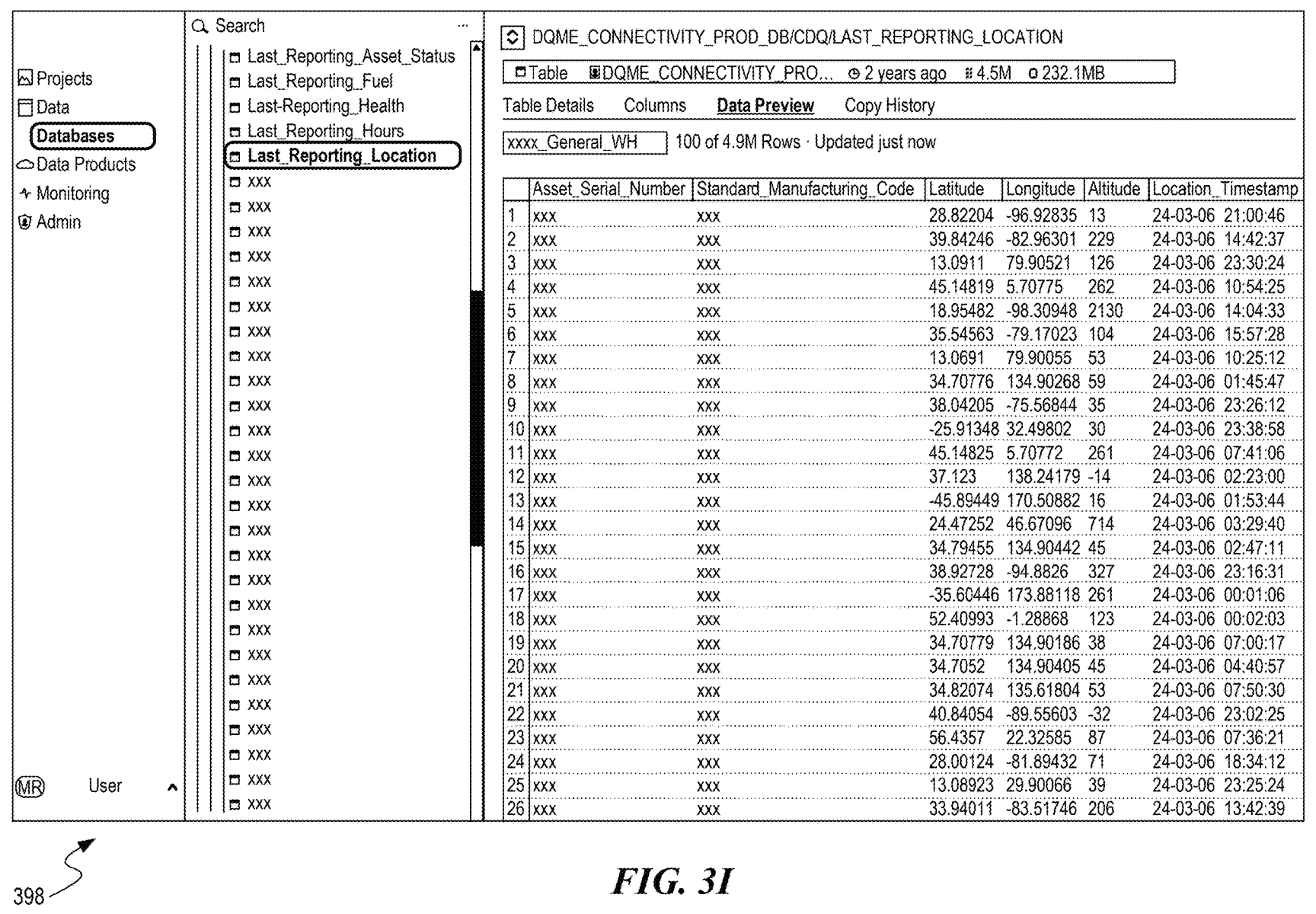

FIG. 3I illustrates a user interface 398 displaying derived objects being updated at the end of each day with latest information of the machines. User interface 398 illustrates an example showing the last known location coordinates and corresponding timestamp of the location coordinates for assets.

Figure 3J:
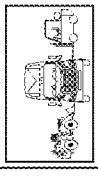
FIG. 3J illustrates a user interface displaying a refreshed fleet list, in accordance with one or more embodiments of the present technology.

FIG. 3J illustrates a user interface 399 displaying a fleet list getting refreshed (e.g., In-process) and the timestamp when the last refresh happened. The refresh plan is shown as a configuration of "Daily", (e.g., updating automatically once a day).

Figure 4:
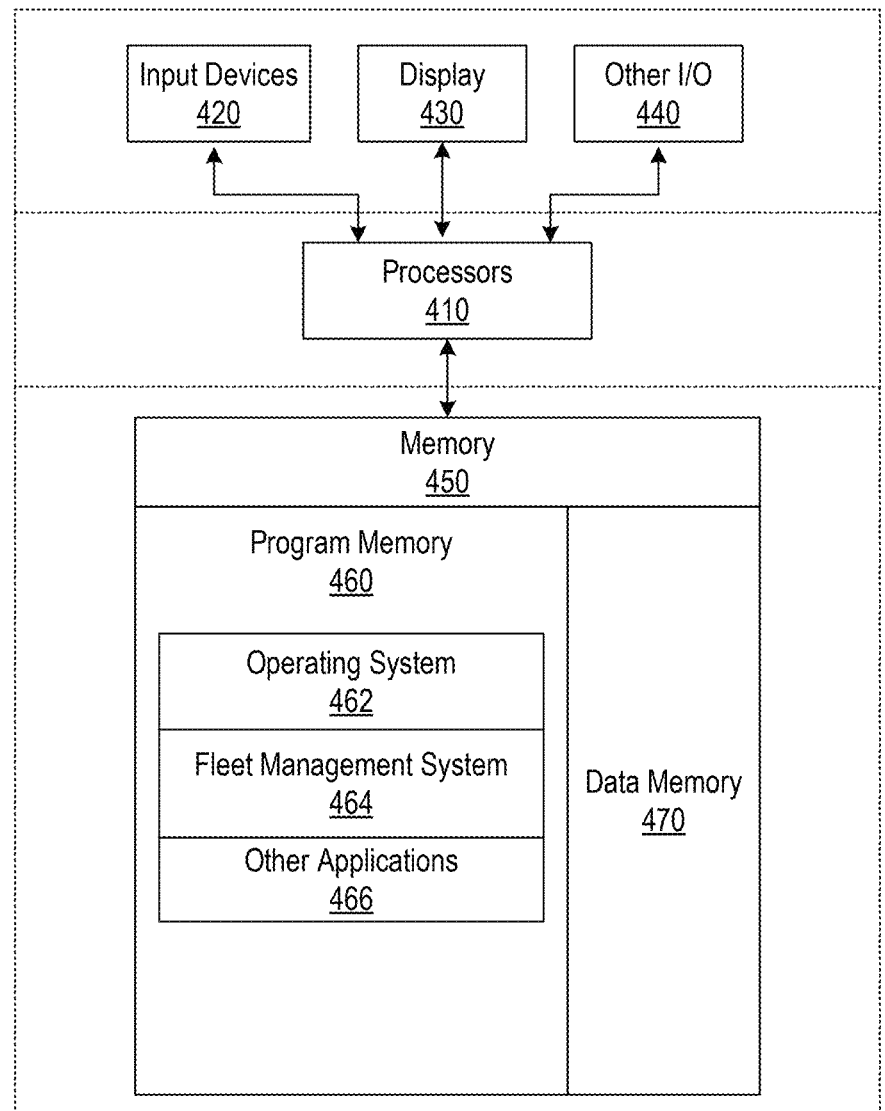
FIG. 4 is a block diagram illustrating an overview of devices on which some implementations can operate.

FIG. 4 is a block diagram illustrating an overview of devices on which some implementations of the disclosed technology can operate. The devices can comprise hardware components of a device 400 that manage entitlements within a real-time telemetry system. Device 400 can include one or more input devices 420 that provide input to the processor(s) 410 (e.g., CPU(s), GPU(s), HPU(s), etc.), notifying it of actions. The actions can be mediated by a hardware controller that interprets the signals received from the input device and communicates the information to the processors 410 using a communication protocol. Input devices 420 include, for example, a mouse, a keyboard, a touchscreen, an infrared sensor, a touchpad, a wearable input device, a camera- or image-based input device, a microphone, or other user input devices.

Processors 410 can be a single processing unit or multiple processing units in a device or distributed across multiple devices. Processors 410 can be coupled to other hardware devices, for example, with the use of a bus, such as a PCI bus or SCSI bus. The processors 410 can communicate with a hardware controller for devices, such as for a display 430. Display 430 can be used to display text and graphics. In some implementations, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 440 can also be coupled to the processor, such as a network card, video card, audio card, USB, firewire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The processors 410 can have access to a memory 450 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 450 can include program memory 460 that stores programs and software, such as an operating system 462, fleet management system 464, and other application programs 466. Memory 450 can also include data memory 470, storing as telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset, configuration data, settings, user options or preferences, etc., which can be provided to the program memory 460 or any element of the device 400.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
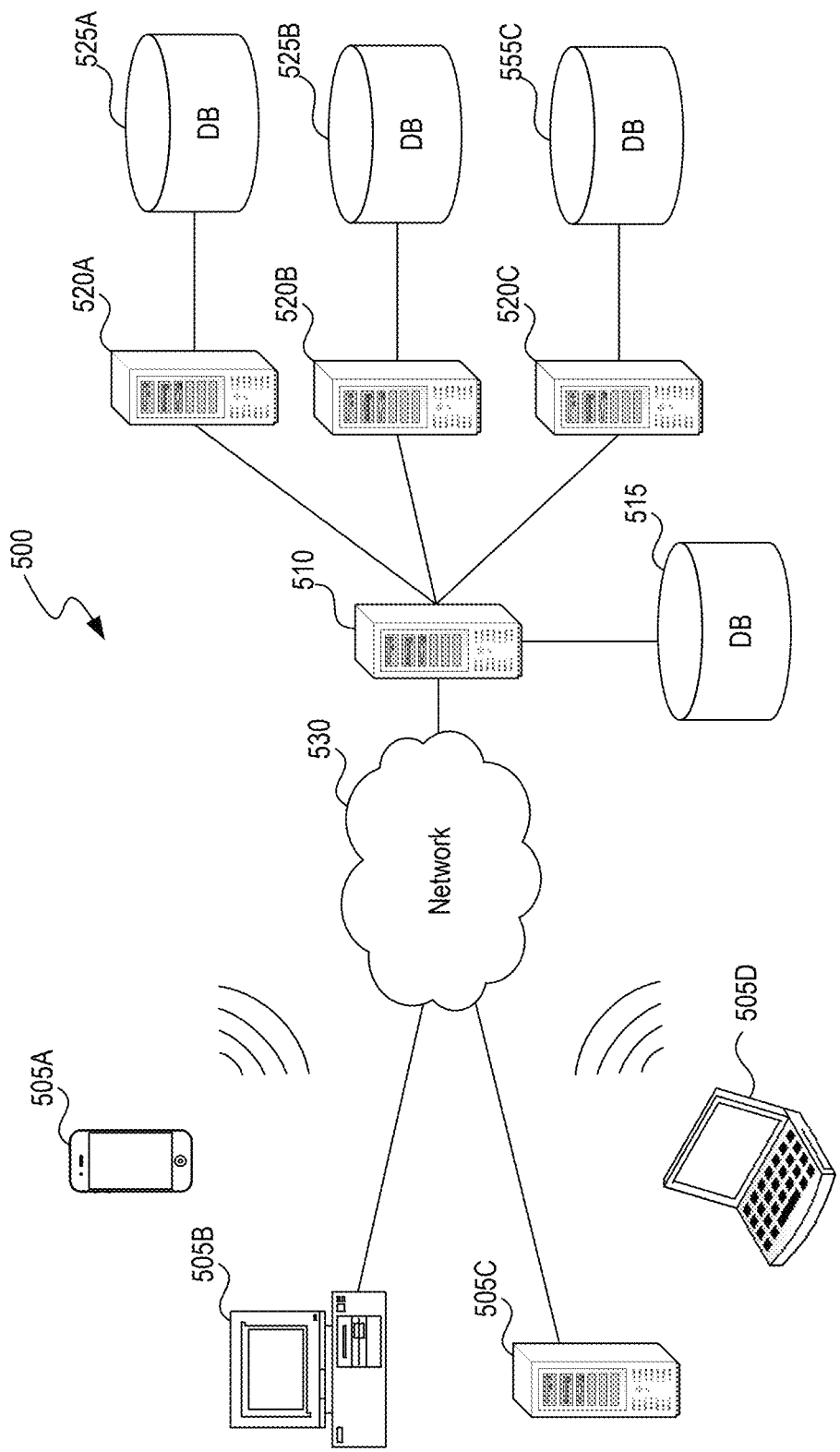
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server 510 can be an edge server which receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as implement data, machine data, sensor data, device data, notification data, as telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
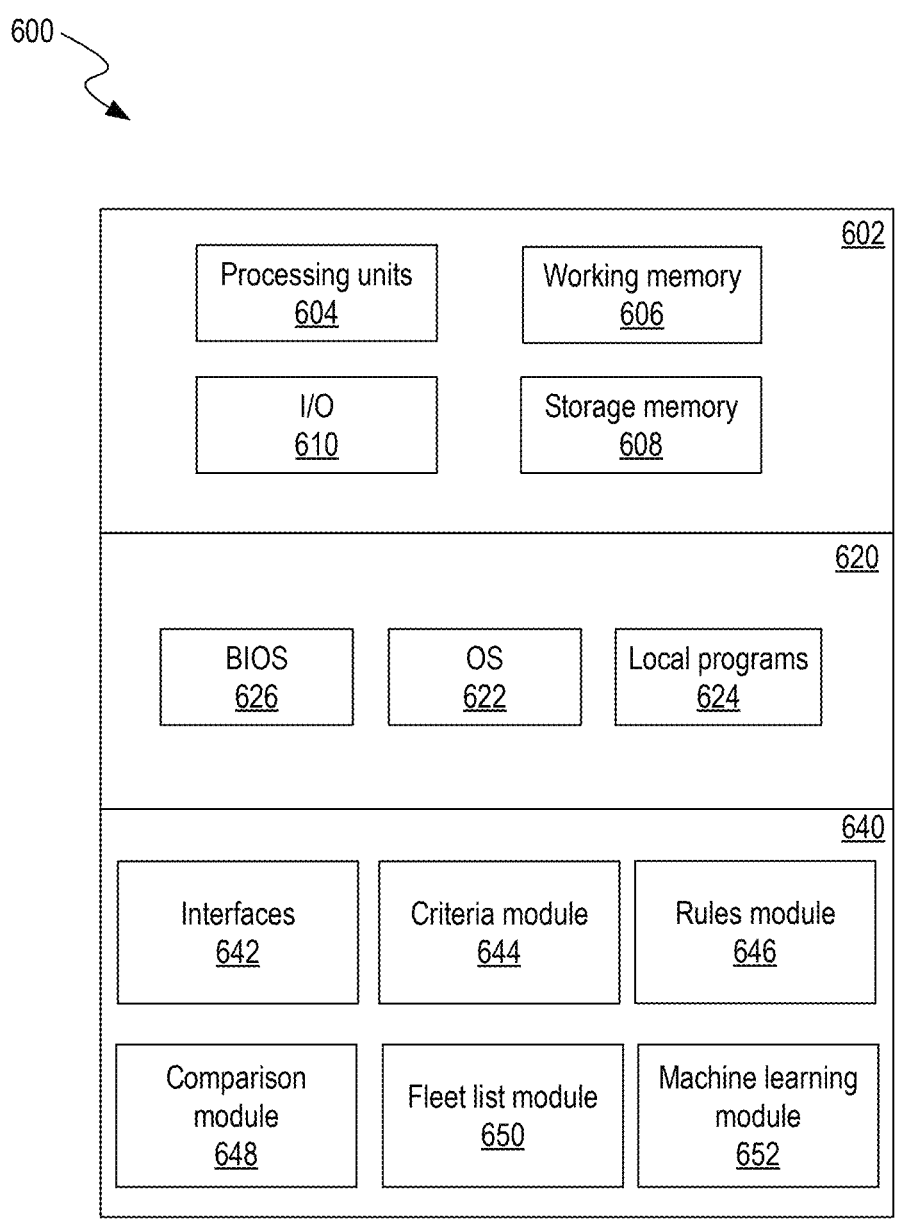
FIG. 6 is a block diagram illustrating components which in some implementations can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware including processing units 604 (e.g. CPUs, GPUs, APUs, etc.), working memory 606, storage memory 608 (local storage or as an interface to remote storage, such as storage 515 or 525), and input and output devices 610. In various implementations, storage memory 608 can be one or more of: local devices, interfaces to remote storage devices, or combinations thereof. For example, storage memory 608 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 515 or storage provided through another server 520). Components 600 can be implemented in a client computing device such as client computing devices 505 or on a server computing device, such as server computing device 510 or 520.

General software 620 can include various applications including an operating system 622, local programs 624, and a basic input output system (BIOS) 626. Specialized components 640 can be subcomponents of a general software application 620, such as local programs 624. Specialized components 640 can include criteria module 644, rules module 646, comparison module 648, fleet list module 650, machine learning module 652, and components which can be used for providing user interfaces, transferring data, and controlling the specialized components, such as interfaces 642. In some implementations, components 600 can be in a computing system that is distributed across multiple computing devices or can be an interface to a server-based application executing one or more of specialized components 640. Although depicted as separate components, specialized components 640 may be logical or other nonphysical differentiations of functions and/or may be submodules or code-blocks of one or more applications.

In some implementations, the criteria module 644 is configured to determine dynamic search option criteria of assets. The dynamic search options can include categories, such as telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset.

In some implementations, the rules module 646 is configured to define rules and parameters for the criteria to identify errors and abnormalities in asset data. The parameters can include threshold values (e.g., hours of operation, location change in a day, etc.) that if exceeded indicate an error or abnormality of an asset. The rules can include hour rules, location rules, fuel rules, diagnostics rules, utilization rules, timestamp rules, subscription rules, or reporting rules. Each individual rule can be predefined, or user defined. In a first example, if a machine operates for more than a time threshold (e.g., 24 hours in a day), the rules module 646 determines that there is an error or abnormality associated with the machine. In a second example, if a location of a machine changes more than a threshold distance (e.g., 3000 miles in a 24-hour period), the rules module 646 determines that there is an error or abnormality associated with the machine. The parameters can include a machine type associated with the asset. For example, if a mining machine is identified at a road construction location, the rules module 646 determines that there is an error or abnormality associated with the mining machine. In some implementations, a user defines some or all of the parameters for the criteria.

In some implementations, the comparison module 648 is configured to compare the stored fleet asset data with the received telematics data to detect any errors, abnormalities, or both in the fleet asset data. Detecting an error/abnormality can include identifying any difference between the stored fleet asset data and the received telematics data. Once a difference is identified, the comparison module 648 can analyze the difference according to the rules and parameters of the selected criteria. In a first example, if a sensor of a machine indicates that a machine has been operating continuously for a time threshold (e.g., 12 hours), the comparison module 648 determines that the sensor has an error due to operators powering down the machine during breaks. In a second example, if a location of a machine changes between multiple countries a distance threshold apart, the comparison module 648 determines that a location device of the machine has malfunctioned. In a third example, if an asset device/part attachment does not match an asset device/part attachment history for the machine, the comparison module 648 determines the asset device/part attachment has been incorrectly assigned to the machine.

In some implementations, the fleet list module 650 is configured to generate a fleet asset list with the updated and verified information. The fleet list can be displayed on a user interface for a user to review. The fleet list can include verified data, such as machine type, telematics device data, radio device data, SIM card data, telematics package, product data (e.g., machine type), subscription data, dealer/customer data, location data, asset health data, electronic control module (ECM) data, diagnostic trouble code (DTC) data, lifetime total measure data, daily delta data, quality rule data, telemetry (e.g., message level) data, or any criteria associated with an asset.

In some implementations, the machine learning module 652 is configured to detect and correct errors, abnormalities, or both in asset data used to create fleet lists. The machine learning module 652 may be configured to detect and correct errors, abnormalities, or both in asset data based on at least one machine-learning algorithm trained on at least one dataset of detected and corrected errors, abnormalities, or both in asset data. The at least one machine-learning algorithms (and models) may be stored locally at databases and/or externally at databases. Customer data grouping devices may be equipped to access these machine learning algorithms and intelligently detect and correct errors, abnormalities, or both in asset data based on at least one machine-learning model that is trained on a dataset of asset information. As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process asset information databases and other data stores to determine how to detect and correct errors, abnormalities, or both in asset data.

Based on the data asset information from asset databases and platforms and other user data stores, at least one ML model may be trained and subsequently deployed to automatically detect and correct errors, abnormalities, or both in asset data. The trained ML model may be deployed to one or more devices. As a specific example, an instance of a trained ML model may be deployed to a server device and to a client device which communicate with a machine. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with item information, such as specific customer information. In such examples, the ML model may be locally cached by the client device.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

INDUSTRIAL APPLICABILITY

The systems and methods described herein can detect and correct errors and abnormalities in assembling fleet lists within one or more platforms. A fleet management system can analyze asset information, such as last known position, history of device attachments, or joins between devices/datasets, to detect and correct errors and abnormalities in the assembling fleet lists (i.e., machine identifier information). The fleet management system can use rules as filter types for recursive evaluation of telemetry errors and abnormalities arising from a source or a sensor. The errors or abnormalities are identified in the asset information when the asset information exceeds a rule. In a first example, the fleet management system identifies an error or abnormality if the location of a machine changes a threshold distance within a time threshold, such as the location of a machine changed from Canada to Africa in under five hours. The fleet management system identifies the error due to the machine requiring a threshold of 60 hours to ship from Canada to Africa. In a second example, the fleet management system identifies an error or abnormality if the hours of operation of a machine exceed a time threshold, such as the hours of operation exceeding 24 hours within a day. A user can select criteria in a fleet management application executing on a user device. The fleet management application can display results of data comparisons and fleet lists of assets. The present systems and methods can be implemented to manage and control, multiple industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A computing system comprising:
at least one processor; and
at least one memory storing instructions that, when executed by the at least one processor, cause the computing system to perform a process for detecting and correcting errors in fleet asset data, the process comprising:
receiving, via a user interface, a selection of one or more criteria for a fleet list;
determining one or more rules associated with the one or more criteria;
selecting a group of machines from the fleet asset data that meet the one or more criteria;
receiving telematics data from one or more devices of the group of machines;
comparing a set of fleet asset data of the group of machines with the telematics data, to identify at least one error based on at least one difference between the set of fleet asset data and the telematics data;
in response to identifying the at least one error, determining at least one machine associated with the at least one error, and sending, to the at least one machine, a notification to replace at least one device associated with the at least one error.

2. The computing system of claim 1, wherein the process further comprises:
determining one or more dynamic search options associated with the one or more criteria;
generating a script to search the fleet asset data for assets associated with the one or more dynamic search options; and
generating the fleet list based on executing the script.

3. The computing system of claim 1, wherein the process further comprises:
identifying a time threshold or a distance threshold for the one or more rules associated with the one or more criteria; and
identify the at least one error based on the telematics data exceeding the time threshold or the distance threshold.

4. The computing system of claim 1, wherein the process further comprises:
grouping machines into one or more categories based on the one or more rules.

5. The computing system of claim 1, wherein the process further comprises:
updating a database with a correction to the telematics data; and
in response to the correction of the at least one error of the telematics data, generating the fleet list according to the one or more criteria.

6. The computing system of claim 5, wherein the correction of the at least one error includes identifying the one or more devices of the group of machines associated with the at least one error and sending a notification to replace the one or more devices.

7. The computing system of claim 1, wherein the at least one error is identified by at least one machine-learning algorithm, wherein the at least one machine-learning algorithm is trained based on at least one dataset associated with previously identified errors.

8. A method for detecting and correcting errors in fleet asset data, the method comprising:
receiving, via a user interface, a selection of one or more criteria for a fleet list;
determining one or more rules associated with the one or more criteria;
selecting a group of machines from the fleet asset data that meet the one or more criteria;
receiving telematics data from one or more devices of the group of machines;
comparing a set of fleet asset data of the group of machines with the telematics data, to identify at least one error based on at least one difference between the set of fleet asset data and the telematics data;
in response to identifying the at least one error,
determining at least one machine associated with the at least one error, and
sending, to the at least one machine, a notification to replace at least one device associated with the at least one error.

9. The method of claim 8, further comprising:
determining one or more dynamic search options associated with the one or more criteria;
generating a script to search the fleet asset data for assets associated with the one or more dynamic search options; and
generating the fleet list based on executing the script.

10. The method of claim 8, further comprising:
identifying a time threshold or a distance threshold for the one or more rules associated with the one or more criteria; and
identify the at least one error based on the telematics data exceeding the time threshold or the distance threshold.

11. The method of claim 8, further comprising:
grouping machines into one or more categories based on the one or more rules.

12. The method of claim 8, further comprising:
updating a database with a correction to the telematics data, and
in response to the correction of the at least one error of the telematics data, generating the fleet list according to the one or more criteria.

13. The method of claim 8, wherein the at least one error is identified by at least one machine-learning algorithm, wherein the at least one machine-learning algorithm is trained based on at least one dataset associated with previously identified errors.

14. The method of claim 12, wherein the correction of the at least one error includes identifying the one or more devices of the group of machines associated with the at least one error and sending a notification to replace the one or more devices.

15. A non-transitory computer-readable storage medium comprising: a set of instructions that, when executed by at least one processor, causes the at least one processor to perform operations for detecting and correcting errors in fleet asset data, the operations comprising:
receiving, via a user interface, a selection of one or more criteria for a fleet list;
determining one or more rules associated with the one or more criteria;
selecting a group of machines from the fleet asset data that meet the one or more criteria;
receiving telematics data from one or more devices of the group of machines;
comparing a set of fleet asset data of the group of machines with the telematics data, to identify at least one error based on at least one difference between the set of fleet asset data and the telematics data;
in response to identifying the at least one error,
determining at least one machine associated with the at least one error, and sending, to the at least one machine, a notification to replace at least one device associated with the at least one error.

16. The non-transitory computer-readable storage medium of claim 15, wherein the operations further comprise:
   determining one or more dynamic search options associated with the one or more criteria;
   generating a script to search the fleet asset data for assets associated with the one or more dynamic search options; and
   generating the fleet list based on executing the script.

17. The non-transitory computer-readable storage medium of claim 15, wherein the operations further comprise:
   identifying a time threshold or a distance threshold for the one or more rules associated with the one or more criteria; and
   identify the at least one error based on the telematics data exceeding the time threshold or the distance threshold.

18. The non-transitory computer-readable storage medium of claim 15, wherein the operations further comprise:
   grouping machines into one or more categories based on the one or more rules.

19. The non-transitory computer-readable storage medium of claim 15, wherein the operations further comprise:
   updating a database with a correction to the telematics data; and
   in response to the correction of the at least one error of the telematics data, generating the fleet list according to the one or more criteria.

20. The non-transitory computer-readable storage medium of claim 15, wherein the at least one error is identified by at least one machine-learning algorithm, wherein the at least one machine-learning algorithm is trained based on at least one dataset associated with previously identified errors.

* * * * *